United States Patent [19]
Champaigne

[11] Patent Number: 5,877,405
[45] Date of Patent: Mar. 2, 1999

[54] GAGE FOR MEASURING THE INTENSITY OF SHOT-BLAST PEENING USING NON-MAGNETIC TEST STRIPS HELD IN PLACE BY SPRING-LOADED PLUNGERS

[75] Inventor: Jack M. Champaigne, South Bend, Ind.

[73] Assignee: Electronics Incorporated, Mishawaka, Ind.

[21] Appl. No.: 864,121

[22] Filed: May 28, 1997

Related U.S. Application Data

[60] Provisional application No. 60/019,248, Jun. 7, 1996.

[51] Int. Cl.⁶ ...................................................... G01N 3/34
[52] U.S. Cl. .......................... 73/11.02; 73/12.11; 33/549
[58] Field of Search ............................. 33/549, 832, 833, 33/573; 73/11.02, 12.05, 12.11, 861.73, 865.3, 167; 29/90.7

[56] References Cited

U.S. PATENT DOCUMENTS

| | | | |
|---|---|---|---|
| 2,350,440 | 6/1944 | Alman | 73/11.02 |
| 3,943,632 | 3/1976 | Albertazzi | 33/549 |
| 5,072,606 | 12/1991 | Koehler et al. | 29/90.7 X |
| 5,297,418 | 3/1994 | Champaigne | 73/11.02 |

*Primary Examiner*—Joseph L. Felber
*Attorney, Agent, or Firm*—Baker & Daniels

[57] ABSTRACT

An Almen type gage to measure the deflection of a test strip relative to a supporting surface to provide an indication of shot blasting intensity includes curved surfaces extending from the support surface for supporting the test strip. A holding block is also mounted on the support surface. Plungers carried by the holding block opposite the curved surface clamp the test strip between the spring loaded plungers and the curved surface. The holding block is undercut to accommodate the test strip so that the weight of the holding block is not borne by the test strip and the test strip is retained on the supporting surface by the force of the spring loaded plungers clamping the test strip against the curved surface. Since the weight of the holding block is not borne by the test strips, the holding force is constant and the weight of the holding block does not corrupt measurement of the deflection of the test strip.

14 Claims, 4 Drawing Sheets

GAGE FOR MEASURING THE INTENSITY OF SHOT-BLAST PEENING USING NON-MAGNETIC TEST STRIPS HELD IN PLACE BY SPRING-LOADED PLUNGERS

This application claims domestic priority based upon U.S. Provisional patent application Ser. No. 60/019,248, filed Jun. 7, 1996.

This invention relates to an improved gage used for measuring the intensity of shot blast peening and more specifically to an Almen gage with an improved support for non-magnetic test strips.

BACKGROUND OF THE INVENTION

U.S. Pat. No. 2,350,440 to John O. Almen discloses a device used for measuring the intensity of shot blast peening on metal parts, commonly known as an Almen gage. Almen gages measure the intensity of the peening process by measuring the curvature of thin metal test strips, after one side of the test strips has been peened. The unbalanced stress in the peened surface causes the test strips to bow. The Almen gage uses two spaced knife edged supports and a measurement indicator with an reciprocating feeler to measure the curvature of the test strip. The spaced knife edged supports hold the test strip as the feeler located between the knife edges engages the test strip. Gaging the height of the arc or bend of the test strip between the two predetermined contact points along the knife edged supports provides an indication of the intensity of the peening process.

Later refinements of the Almen gage have replaced the knife edged supports with four round contact balls with the operator manually holding the test strip in place for measurement. Another version of the Almen gage added a spring loaded finger to hold the test strip in place. The spring loaded finger was difficult to operate and subject to abuse and damage. Still another version of the Almen gage is disclosed in U.S. Pat. No. 5,297,418, in which magnets mounted in the base magnetize the contact balls, thereby holding test strips made of a magnetic material in place.

More recently, test strips have become available which are made out of a non-magnetic material, such as aluminum. Since these test strips cannot be held in place by magnets, the operator must either manually hold the test strip in place or a heavy block must be placed on top of the test strip to be measured. It is undesirable for the operator to hold the strip in place due to the variability of measurement results caused by variation in the holding force by the operator. It is also undesirable to use the heavy block, which normally has four balls or protrusions used to pinch or capture the strip measurements securely with the four balls provided on the gage. This method is adequate, but it is difficult to install the four balls in a flat plane needed to prevent strip deflection. Furthermore, even if the block has its four balls in an ideal flat condition, the balls on the gage may not be in a flat plane, and therefore unequal pinching force will result.

SUMMARY OF THE INVENTION

The present invention overcomes these problems by providing four spring loaded plungers mounted in a heavy block that is then placed on the Almen gage in such a manner as to capture the aluminum strip (or a strip made of any other material) by pinching the strip between the plungers and the four balls on the Almen gage. Each of the four plungers is aligned with a corresponding one of the balls on the Almen gage so as not to cause any deflection to the strip that would tend to corrupt the strip measurement. The heavy block is designed to rest directly onto the Almen gage housing as opposed to resting on the strip via the balls, and therefore the pinching force is controlled by the spring loaded plungers and is not influenced by the weight of the block. The block is lowered into place on the Almen gage housing by sliding it down the posts already provided on the Almen gage for locating the strip in the measurement position.

BRIEF DESCRIPTION OF THE DRAWINGS

These and other advantages of the present invention will become apparent from the following description, with reference to the accompanying drawings, in which.

DETAILED DESCRIPTION OF THE INVENTION

Figure 1:
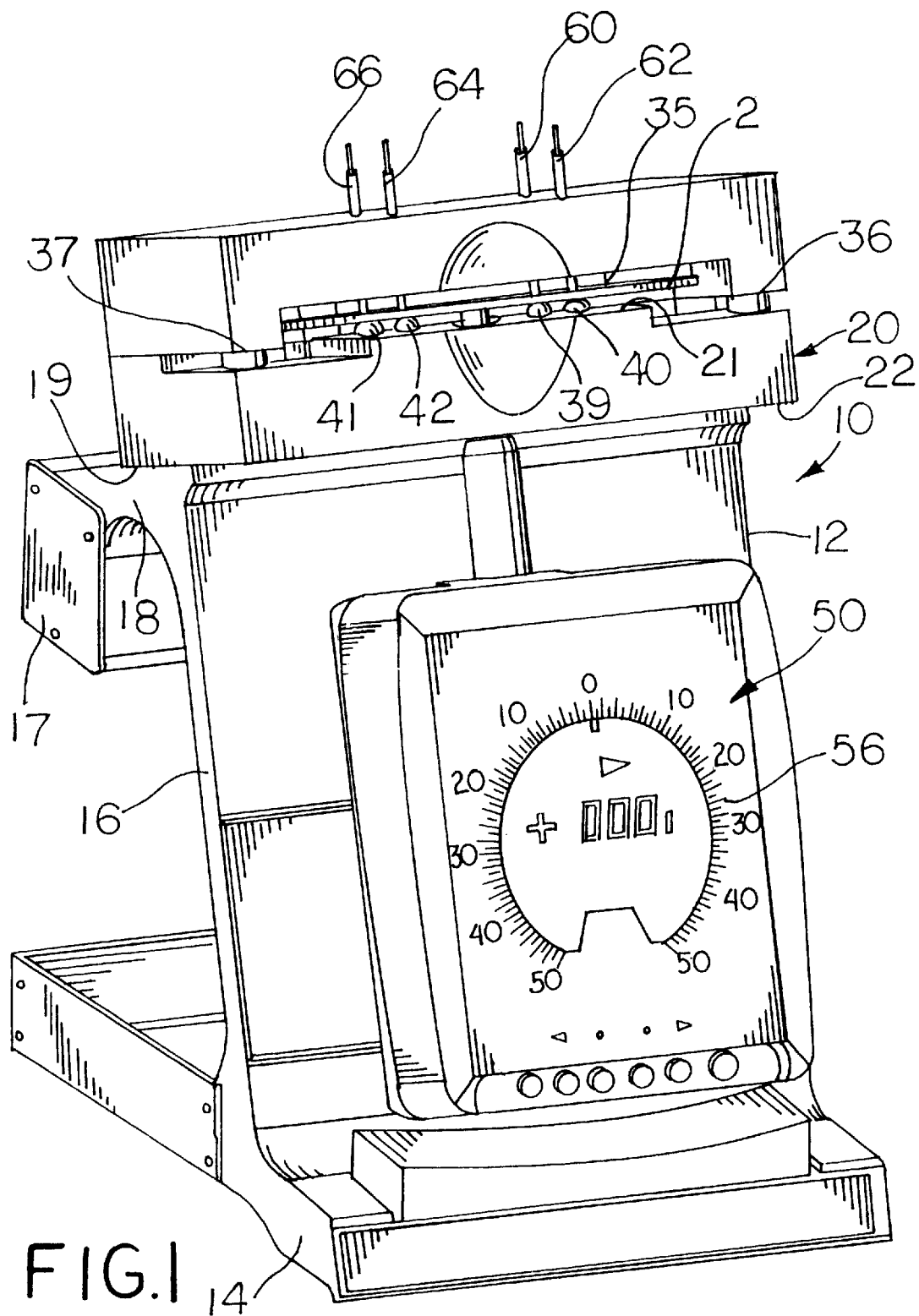
FIG. 1 is a perspective view of a gage made according to the present invention illustrated with a test strip and holding block installed thereon in the operative position for measuring deflection of the strip.
Figure 2:
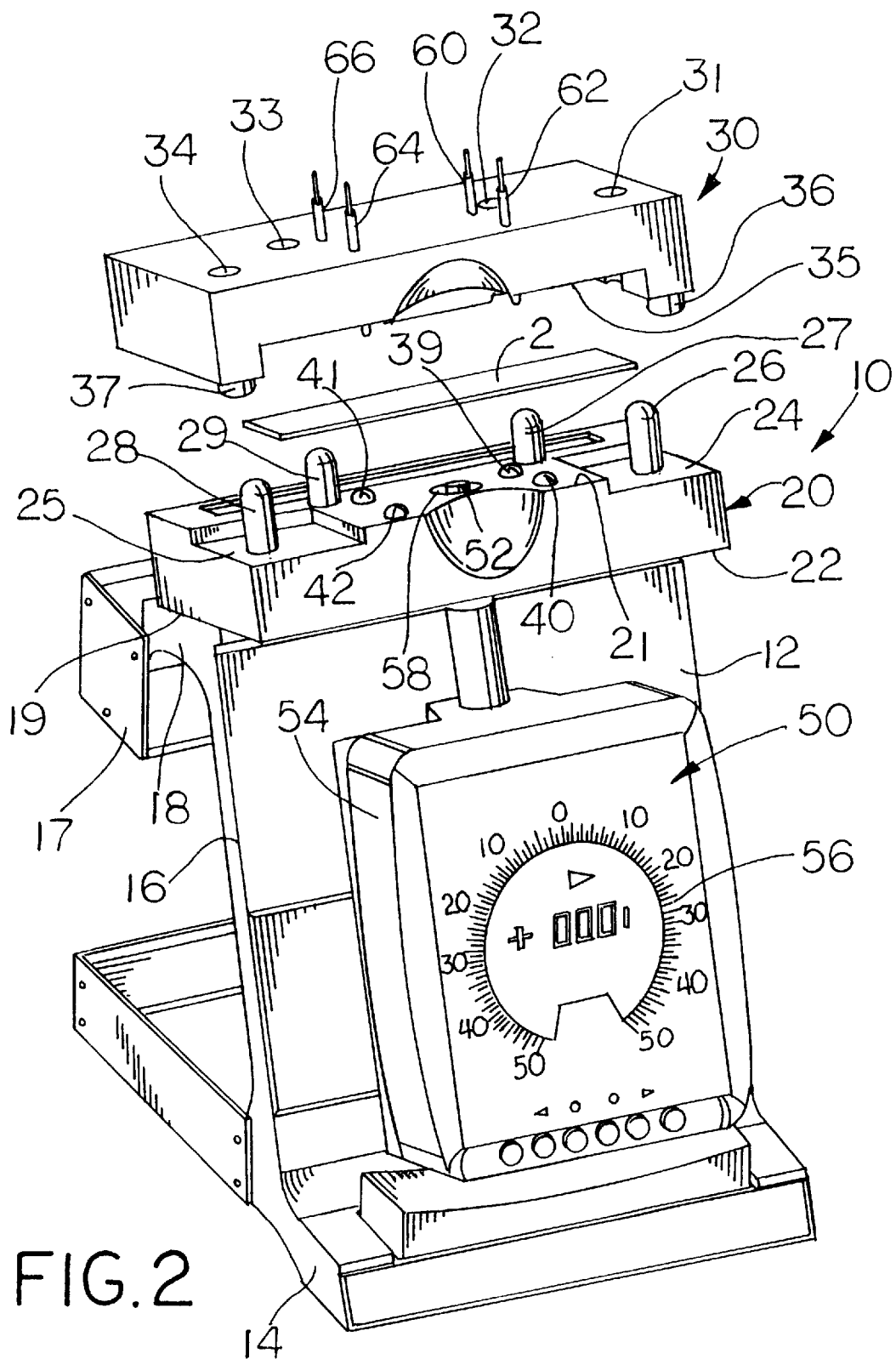
FIG. 2 is a view in perspective similar to FIG. 1 but illustrating the test strip and holding block off of the test gage.
Figure 3:
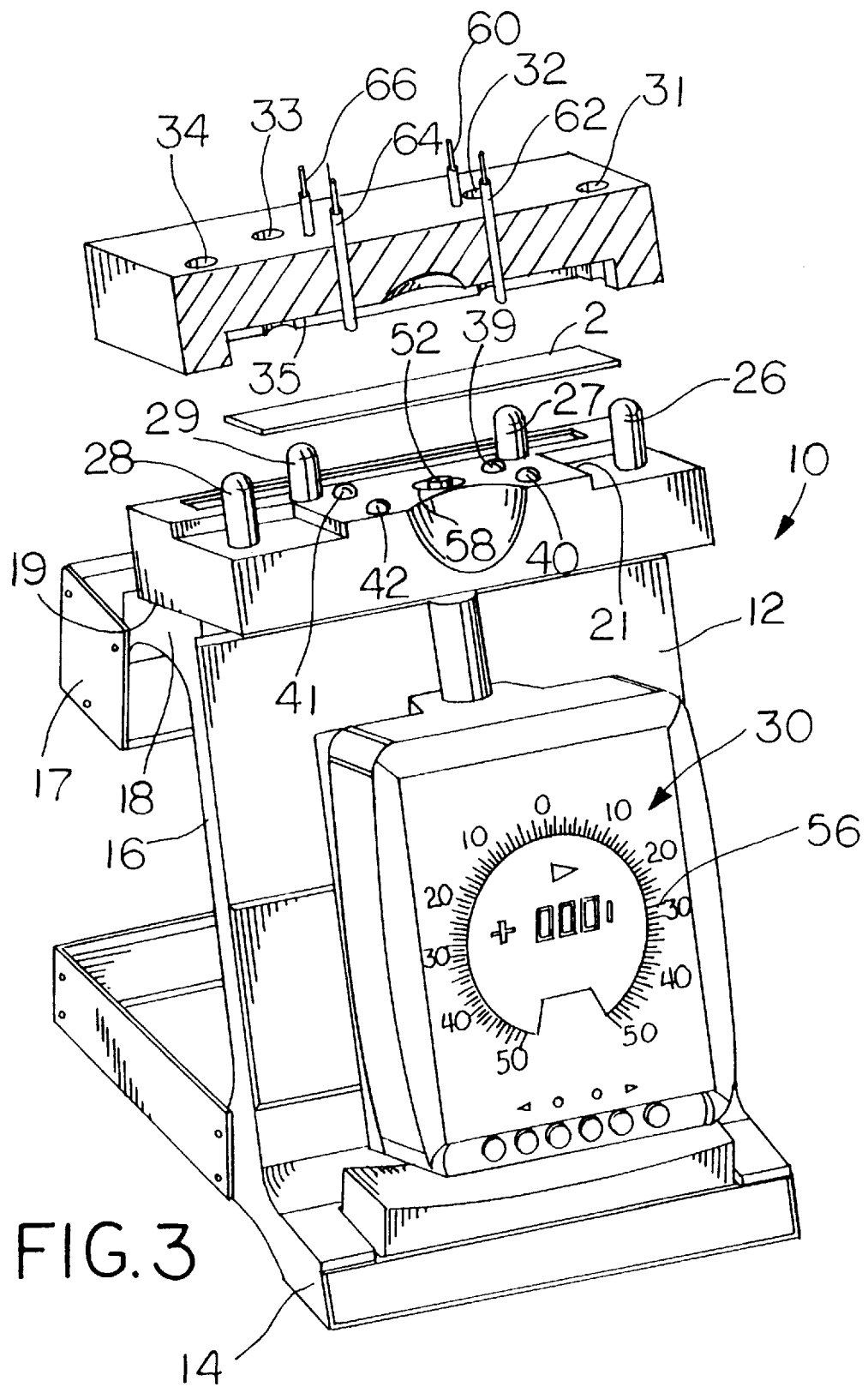
FIG. 3 is a view similar to FIG. 2 but illustrating the holding block in cross section to illustrate the manner in which the spring loaded plungers are mounted in the holding block.

FIGS. 1–3 show the improved gage 10 of this invention. Gage 10 is used to measure the curvature of the test specimen strips or Almen strips 2. Test strips 2 are thin strips of metal, such as steel or aluminum, and are approximately 3 inches in length, 0.75 inches in width, and 0.05 inches in thickness.

Gage 10 includes a stand 12 with a lower support base 14 and a back partition 16 extending vertically from support platform 14. Back partition 16 terminates in an elevated shoulder 18. Generally, stand 12 is constructed from a heavy durable material, such as a cast metal, for stability. A tray 17 is mounted to the back side of shoulder 18. Test strips 2 can be stacked within tray 17 for convenient access during testing.

A test platform 20 is securely mounted to the top face 19 of shoulder 18, by any conventional method. Test platform 20 is constructed of any suitable durable material. Test platform 20 projects forwardly of back partition 16 and has a top face 21 and bottom face 22. A central opening 58 is formed in platform 20, and extends through the overhanging portion of test platform 20. As shown in FIGS. 1 and 2, top face 21 has two recessed front corners 24, 25 and four alignment posts 26, 27, 28, 29 protrude upwardly from its top face 21. Posts 26, 28 protrude from approximately the centers of corner recesses 24, 25 respectively and are used to align the ends of a test strip 2. Posts 27, 29 protrude vertically from top face 21 along a longitudinal line spaced behind posts 26, 28 with respect to the front of test platform 20 and are used to locate the test strip relative to the top face 21.

A holding block generally indicated by the numeral 30 mounts on the upper surface 21 of the platform 20 to hold the test strip 2 in place. The block 30 includes bores 31, 32, 33, and 34 which accept the alignment posts 26, 27, 29 and 28 respectively to properly position the block 30 on the surface 21 when the block 30 is installed on the platform 20. Block 30 also includes an undercut portion 35 which extends across the test strip 2 when the block 30 is installed on the platform 20, and also includes portions such as downwardly extending feet 36, 37 that rest directly on the platform surface 21. Accordingly, the block 30 is supported off of the test strip 2 when measurement of the test strip is effected. The block 30 carries spring loaded plungers 60, 62, 64 and 66 which register with spherical surfaces 39, 40, 41 and 42 when the test block 30 is installed on the platform 20 by sliding the bores 31–34 over their corresponding alignment posts 26–29. The block 30 will then be supported on platform 20, but because of the undercut 35, will not engage test strip 2. Accordingly, the test strip 2 is retained against the spherical surfaces 39, 40, 41 and 42 by plungers 60, 62, 64 and 66 when the block 30 is installed on the platform 20. Since the weight of the block 30 itself is supported directly on the platform 20, the weight of the block is not born by the test strip 2, so that the test strip 2 is held in place solely by the plunger 60–68 acting against the spherical surfaces 39–42.

Figure 4:
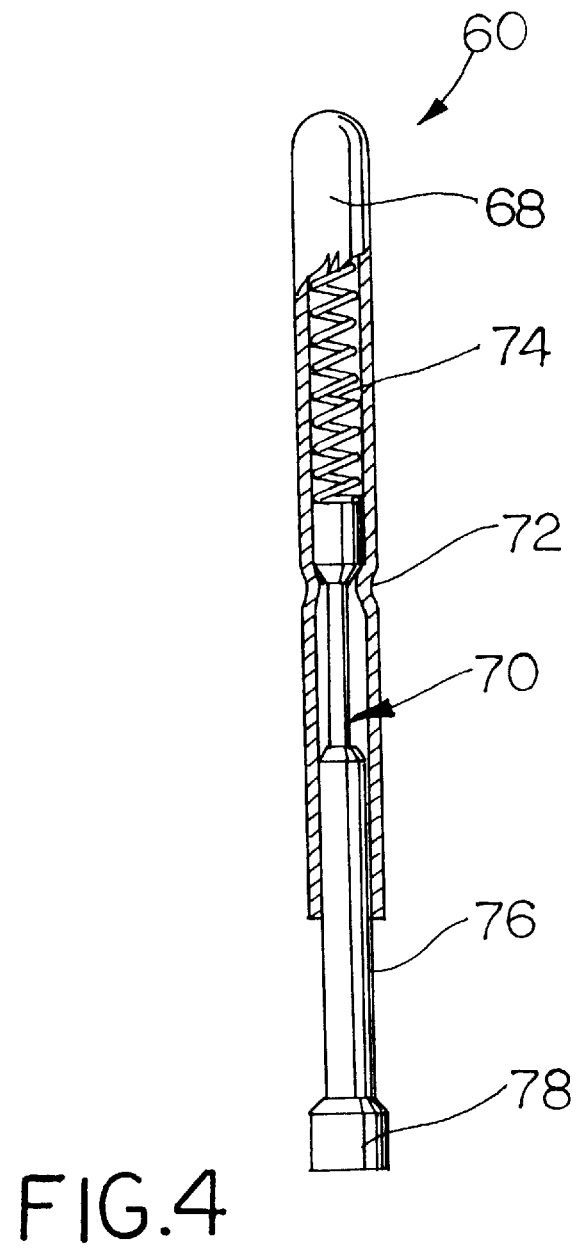
FIG. 4 is a view, partly in cross section of the spring loaded plunger used in the gage illustrated in FIGS. 1–3.

Referring to FIG. 4, a typical spring loaded plunger 60 is shown in cross section. Each of the other plungers 62–66 is identical to the plunger 60 and will not be described in detail. Plunger 60 includes a housing 68 which slidably receives sliding member 70 therein. Member 70 is urged toward pinched in portion 72 of the housing 68 by spring 74. A portion 76 of member 70 extends from housing 68 and terminates in a head 78, which is urged against the test strip by the spring 74 when a measurement is being effected.

As shown in FIGS. 1–3, back partition 16 supports a conventional distance measuring indicator 50. Indicator 50 includes an instrument casing 54 mounted to the front side of back partition 16 underneath the overhanging portion of test platform 20. Casing 54 includes a front reading display 56. Indicator 50 can use any conventional display method whether electronic or mechanical. A reciprocating plunger or feeler 52 extends upwardly from casing 54 through opening 58 in test platform 20.

The intensity of the shot blast peening process is determined by measuring the height of the curvature of the test strips between the contact balls. Each individual test strip 2 is exposed on one side to the shot blasting peening process to be measured. The unbalanced stress in the peened surface bows the test strips. As shown in FIGS. 1–3, a test strip 2 is placed on test platform 20. Strip 2 is positioned to be located between end alignment posts 26, 28 and against side alignment posts 27, 29. In this position, strip 2 rests atop contact spherical surfaces 39–42.

The block 30 is then installed on the platform 20 by sliding the apertures 31–34 over the posts 26–29. Accordingly, the lower ends 78 of the plungers 60–68 will clamp the test strip 2 against corresponding spherical surfaces 39–42. It will be remembered that, as discussed above, the weight of the block 30 is supported directly on upper surface 21 of the platform 20; accordingly the weight of the block 30 does not rest against the test strip 2, the test strip 2 being held in place solely by the plungers bearing against the upper surface of the strip 2 and clamping the latter against the spherical surfaces 39–42. Accordingly, the reading of the deflection of the test strip 2 is not affected by either the weight of the block or the fact that the spherical surfaces 39–42 may be misaligned and not define a flat plane, since the spring loaded plungers 35–38 act against the strip 2 to clamp the latter in place. Accordingly, no unequal tension forces can occur against the strip 2 and accurate readings of the deflection may be obtained. Measurements are made by engagement of the feeler 52 with the test strip 2. Accordingly, deflection of the strip will be indicated by the display 56, which will provide an indication of the curvature of the strip 2.

What is claimed:

1. Gage for measuring the displacement of a test strip used to measure the intensity of shot blasting comprising a stand having a support surface for supporting said test strip, an indicator for measuring deflection of said test strip relative to said support surface and for providing a visual indication of said deflection, a holding block supported by said support surface and extending over said test strip, said support surface and said holding block including supports for supporting said holding block off of said test strip whereby deflection of the test strip will be unaffected by the weight of the block, and spring loaded members carried by the holding block and movable relative thereto for holding said test strip on said support surface.

2. Gage as claimed in claim 1, wherein curved surfaces project above said support surface and said spring loaded members engage said test strip opposite said curved surfaces to pinch said test strip against the curved surfaces to thereby retain the test strip on the support surface.

3. Gage as claimed in claim 2, wherein said holding block includes feet engaging said stand to support said holding block over said test strip.

4. Gage as claimed in claimed in claim 3, wherein said holding block includes an undercut portion extending over the test strip whereby the weight of the holding block is not borne by the test strip when the holding block is installed on the stand.

5. Gage as claimed in claim 2, wherein each of said spring loaded members include a housing, a plunger slidably mounted in said housing, and a spring yieldably urging said plunger toward said curved surface.

6. Gage for measuring the displacement of a test strip used to measure the intensity of shot blasting comprising a stand having a support surface for supporting said test strip, an indicator for measuring deflection of said test strip relative to said support surface and for providing a visual indication of said deflection, said surface including supporting members for supporting said test strip, and spaced apart, spring loaded members engaging portions of the strip opposite said supporting members for yieldably clamping said test strip against said supporting members.

7. Gage as claimed in claim 6, wherein said supporting members include curved surfaces projecting above said support surface, said spring loaded members engaging said test strip opposite said curved surfaces to pinch said test strip against the curved surfaces to thereby retain the test strip on the support surface.

8. Gage as claimed in claim 7, wherein each of said spring loaded members include a housing, a plunger slidably mounted in said housing, and a spring yieldably urging said plunger against said curved surface.

9. Gage as claimed in claim 6, wherein said strip is defined between corners, said supporting members being located at said corners, each of said spring loaded members being located over said supporting members and including a spring loaded plunger clamping said test strip against a corresponding one of said supporting members.

10. Gage as claimed in claim 6, wherein each of said supporting members is a curved surface engaging a common side of the test strip, each of said spring loaded members including a spring loaded plunger over a corresponding one of said curved surfaces to engage a side of said test strip opposite said common side of the test strip to thereby clamp the test strip against the curved surfaces.

11. Gage as claimed in claim 6, wherein said supporting members each engage a common side of the test strip and each of the spring loaded members include a spring loaded plunger over a corresponding one of said supporting members to thereby clamp the test strip against the supporting surfaces.

12. Gage as claimed in claim 11, wherein each of said spring loaded members is mounted in a holding block supported on said stand over the test strip.

13. Gage as claimed in claim 12, wherein said holding block includes feet engaging said stand to support said holding block over said test strip.

14. Gage as claimed in claim 13, wherein said holding block includes an undercut portion extending over the test strip whereby the weight of the holding block is not borne by the test strip when the holding block is installed on the stand.

* * * * *